United States Patent [19]
Kazami et al.

[11] Patent Number: 6,035,093
[45] Date of Patent: Mar. 7, 2000

[54] IMAGE FILE EDITING APPARATUS AND METHOD AND PROGRAMMED MEDIUM FOR REALIZING THE SAME

[75] Inventors: Kazuyuki Kazami, Tokyo; Kenji Toyoda, Chigasaki, both of Japan

[73] Assignee: Nikon Corporation, Tokyo, Japan

[21] Appl. No.: 08/956,419

[22] Filed: Oct. 23, 1997

Related U.S. Application Data

[60] Provisional application No. 60/052,767, Jul. 17, 1997.

[30] Foreign Application Priority Data

Oct. 23, 1996 [JP] Japan ................................ 8-280915

[51] Int. Cl.[7] ...................................................... H04N 5/93
[52] U.S. Cl. .................................. 386/52; 386/46; 360/69
[58] Field of Search .................................. 386/1, 46, 52, 386/83; 369/83, 53–54, 75.2; 360/13, 69, 99.02, 99.06; 348/231, 232, 552; H04N 5/93

[56] References Cited

U.S. PATENT DOCUMENTS

| | | | |
|---|---|---|---|
| 5,390,027 | 2/1995 | Henmi et al. | 358/335 |
| 5,471,452 | 11/1995 | Kishi | 369/83 |
| 5,488,409 | 1/1996 | Yuen et al. | 348/5 |
| 5,541,738 | 7/1996 | Mankovitz | 358/335 |
| 5,703,994 | 12/1997 | Lee et al. | 386/52 |
| 5,727,060 | 3/1998 | Young | 380/10 |
| 5,923,810 | 7/1999 | Nishikata | 386/56 |

FOREIGN PATENT DOCUMENTS

| | | | |
|---|---|---|---|
| 0545727 | 6/1993 | European Pat. Off. | G11B 27/32 |

*Primary Examiner*—Thai Tran
*Assistant Examiner*—Vincent F. Boccio
*Attorney, Agent, or Firm*—Vorys, Sater, Seymour and Pease LLP

[57] ABSTRACT

An image file editing apparatus comprises a media drive device for performing writing and reading of image files on a recording medium that is removably installed from outside, a list display device for displaying a list of image files on the recording medium, a file selecting device for selecting among the displayed list of the image files in accordance with an external operation, and an editing device for performing a predetermined editing operation on an image file or files that is/are selected. In response to an instruction from outside to eject the recording medium, a temporary storage device of the apparatus stores the selected image file(s), and a media ejecting device then ejects the recording medium after completion of storing to the temporary storage device. An editing operation can be performed on the image file(s) stored in the temporary storage device from the ejected recording medium and an image file or files selected by the file selecting device from a subsequently installed recording medium.

13 Claims, 6 Drawing Sheets

IMAGE FILE EDITING APPARATUS AND METHOD AND PROGRAMMED MEDIUM FOR REALIZING THE SAME

CROSS-REFERENCE TO RELATED APPLICATIONS

This application claims the benefit of provisional application no. 60/052,767 filed Jul. 17, 1997.

This application also claims the priority of Japanese Patent Application No. 8-280915 filed Oct. 23, 1996, which is incorporated herein by reference.

BACKGROUND OF THE INVENTION

1. Field of the Invention

The present invention relates to an image file editing apparatus and method for editing image files (that may include sound/audio data in addition to image data) on recording media, and to a medium in which a program for image file editing is recorded. In particular, this invention relates to an image file editing apparatus and method and to a medium containing an image file editing program, whereby image files on removable recording media can be conveniently edited.

2. Related Background Art

Image file editing apparatus are known which perform editing operations, such as linking processing and image composition, in regard to image files including moving picture or still picture data, for example. By performing such editing operations, it is possible to create, among other things, a single video work by suitably linking image files that have been separately obtained by imaging multiple scenes in different image pickup operations.

Also, with recent developments in digital signal processing, programs have been developed for realizing the image file editing apparatus as described above using computers.

FIG. 6 is a drawing showing a display screen of a computer using this type of program.

In FIG. 6, at the lower left of a display screen 51, a thumbnail display section 52 is displayed for listing thumbnail images. At the top of display screen 51, an editing region 53 is displayed for appropriately placing thumbnail images by drag-and-drop operations using a mouse, for example. Also, near the topmost part of display screen 51, a menu bar M is displayed for accessing various menus, including a file menu, etc. for performing operations on image files.

In the following, the interactive operations of the operator with this screen will be explained.

First, the operator selects (e.g., by clicking a mouse) an image file on a recording medium using a file menu accessed by the file menu option 54.

The computer partially reads out the leading image from the selected image file, and generates a thumbnail image by reducing the pixel density of that leading image. The thumbnail image generated in this manner is displayed in a list with its associated file name in the thumbnail display section 52. In FIG. 6, thumbnail images and file names of image file A and image file B are listed.

From the thumbnail display section 52, the operator can drag and drop individual thumbnail images up to editing region 53.

After such drag-and-drop operations, the computer arranges the thumbnail images in an array in accordance with the dropped positions of the thumbnail images.

When a playback button (triangular mark) near the top-right corner of editing region 53 is clicked, the computer sequentially reads out the corresponding image files in the order of the thumbnail images arranged in editing region 53. The computer sequentially plays back the image files read out in this manner in a sub-window (not illustrated) that is temporarily created on display screen 51.

Also, when "compile movie" on file menu or the like is selected, the computer creates a single image file by sequentially linking the corresponding image files in the order of the thumbnail images arranged in editing region 53.

Since image files generally require a large file capacity, a series of image files often cannot be contained on a single recording medium. For example, when using a digital video camera to record an event spanning a long period of time, such as a wedding, a single recording medium may not be sufficient to last the entire event. Thus, recording must be conducted using multiple recording media, with different image files being recorded on each recording medium.

When editing image files distributed among multiple recording media, a warning display 55 as shown in FIG. 6 is frequently displayed by conventional image file editing apparatus and image editing programs. In the form shown, the warning display 55 provides a warning indicating that image file A displayed in thumbnail display section 52 cannot be found on the current recording medium. Consequently, the editing operation cannot be normally performed with respect to that image file. This situation would arise when, for example, the recording medium containing image file A has been replaced by a current one for newly registering another image file B in thumbnail display section 52.

In the conventional example, therefore, recording media have to be replaced many times following warning displays from the apparatus, thus making editing operations cumbersome and complex.

In order to avoid the above-mentioned problems, it has heretofore been necessary first to prepare separately a large-capacity hard disk device or the like, and to copy all the image files on the individual recording media to the hard disk device. This process is both time-consuming and inconvenient.

SUMMARY OF THE INVENTION

It is an object of the present invention to provide an image file editing apparatus in which image files on a plurality of recording media can be easily and conveniently edited.

It is also an object of the invention to provide such an image file editing apparatus that is able to display thumbnail images for image files on recording media that have been ejected.

It is a further object of the invention to provide a medium in which a program is recorded for realizing such image file editing apparatus as just mentioned.

In accordance with one of its principal aspects, the present invention provides an image file editing apparatus which can achieve the above objects and which comprises media drive means for performing writing and reading of image files on a recording medium that is removably installed from outside; list display means for causing the media drive means to acquire and produce identifying information about image files on the recording medium, the list display means displaying a list of image files in the format of the identifying information; file selecting means for selecting, in accordance with an external selecting operation, among the listed image files displayed by the list display means; instruction input means for receiving, from outside, an instruction for ejection of the recording medium; temporary storage means for causing the media drive means to read at least one image file selected by the file selecting means from the recording medium when the instruction input means receives the instruction for ejection, and for temporarily storing the at least one image file from the recording medium; media ejecting means for ejecting the recording medium from the media drive means, or placing the recording medium in an ejection-standby state, after completion of storing to the temporary storage means; and editing means for performing an editing operation on an image file stored by the temporary storage means from the ejected recording medium and an image file selected by the file selecting means from a subsequently installed recording medium.

The editing operation preferably comprises at least one of copying, moving, linking, and image composition.

Also, in a preferred mode, the list display means continues display of the list of image files on a recording medium after ejection of that recording medium, and changes a display mode of non-selected image files on that recording medium into a predetermined display mode for indicating unavailability of the non-selected image files for editing.

It is further preferred that the editing means be constructed to perform the editing operation after storage of the image file selected from the subsequently installed recording medium by the temporary storage means and ejection of the subsequently installed recording medium.

In an image file editing apparatus according to the preferred practice of the invention, selected image files can be automatically recorded when the recording medium is to be ejected. Accordingly, the operator can be spared the inconvenience of consciously transferring image files to a hard disk drive or the like. Further, even if the operator mistakenly ejects the recording medium, image editing can be continued without any problem.

The image file editing apparatus of the present invention can also utilize a memory with high efficiency, by automatically recording to the memory only the image files selected in the process of the image editing operation. Accordingly, the storage capacity of the memory is not wasted.

In accordance with another of its principal aspects, the invention provides a medium in which is recorded a program for realizing the above-discussed image file editing apparatus, using a computer equipped with the media drive means. The program causes the computer to function as the list display means, the file selecting means, the instruction input means, the temporary storage means, the media ejecting means, and the editing means.

In accordance with still another of its principal aspects, the invention provides an image file editing method which can be implemented with the above-discussed apparatus and programmed medium.

The aforementioned and other aspects of the invention, as well as its various features and advantages, will be more fully appreciated from the following detailed description taken in conjunction with the accompanying drawings.

DETAILED DESCRIPTION OF THE INVENTION

Figure 1:
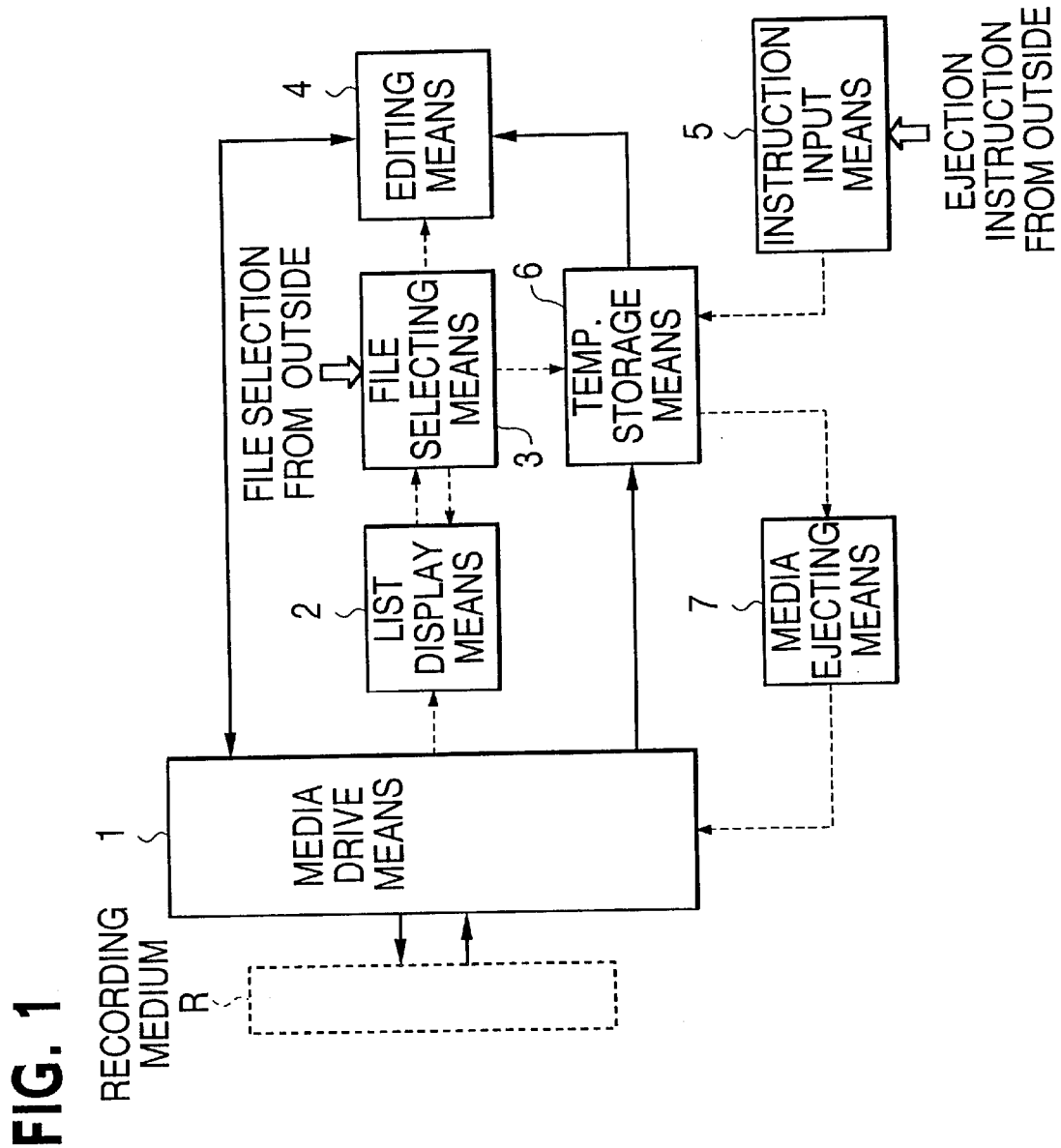
FIG. 1 is a block diagram for explaining basic principles of an image file editing apparatus according to the invention.

FIG. 1 is a block diagram for explaining basic principles of an image file editing apparatus according to the invention.

As shown in FIG. 1, the image file editing apparatus includes media drive means 1 for performing writing and reading of image files on a recording medium R that is removably installed from outside, and list display means 2 for causing the media drive means 1 to acquire and produce identifying information about image files on the recording medium R, and for displaying a list of image files in the format of the identifying information. The identifying information may be any information that enables the operator to identify the image files, and may include such information as thumbnail images, image file names, and file creation dates and times.

The apparatus further includes file selecting means 3 for selecting from the list of the image files displayed by the list display means 2 in accordance with an external selecting operation. An editing means 4 is provided for performing a predetermined editing operation on at least one image file selected by the file selecting means 3. An instruction input means 5 receives, from outside, an instruction for ejection of the recording medium R.

A temporary storage means 6 causes the media drive means 1 to read the image file or files selected by the file selecting means 3 from the recording medium R when the instruction input means 5 receives the instruction for ejection, and it temporarily stores the read-out image file or files.

A media ejecting means 7 ejects the recording medium R from the media drive means 1, or places the medium in an ejection standby state, after completion of storing the read-out images into the temporary storage means 6.

The editing means 4 can perform an editing operation both on image files stored in the temporary storage means 6 from a recording medium that has been ejected (or a plurality of such media) and on image files selected by the file selecting means 3 from a recording medium currently loaded in the apparatus. The editing operation may include any suitable editing processing, such as one or more of copying, moving, linking, and image composition of the image files.

In a preferred mode, the list display means 2 continues to display the list of image files on the recording medium R even after ejection of that recording medium. It preferably also changes a display mode of non-selected image files of the recording medium to a predetermined display mode indicating that those image files are unavailable for editing.

Next, an example of a specific procedure for image file editing using the apparatus described above will be explained.

First, the operator installs a first recording medium R. The list display means 2 then acquires the identifying information of the image files on the recording medium R and displays a list of the image files in the format of the identifying information.

The operator then suitably selects, via the file selecting means 3, the image file or files needed for image editing from among the listed image files. At this stage, the operator can perform a predetermined editing operation on the selected image files using the editing means 4.

If an instruction for ejection of the first recording medium R is given to the instruction input means 5 at this stage, as when the operator wishes to install a second recording medium, the image files that are presently selected are automatically recorded in the temporary storage means 6. After such automatic recording is completed, the media ejecting means 7 ejects the first recording medium R or puts it into a state in which the medium is ready to be ejected.

The operator next replaces the first recording medium with the second recording medium, and further performs an operation of selecting image files from the second recording medium. At this stage, the operator can use the editing means 4 to perform an editing operation with respect to the selected image files from the first recording medium, which are stored in the temporary storage means 6, and the image files selected from the second recording medium. The editing operation may include one or more of copying, moving, linking, image composition, etc.

To facilitate the editing operation, it is preferred that the list display means 2 continues to display the list of image files on ejected recording media even after the ejection thereof. It is further preferred that the list display means 2 displays the identifying information regarding such image files other than the selected ones by changing the information to a display format, such as reduced brightness, indicating that those image files are unavailable for editing.

A program medium in accordance with the invention can be a medium which is recorded with a program executed by a computer for realizing the above-mentioned list display means 2, file selecting means 3, editing means 4, instruction input means 5, temporary storage means 6, and media ejecting means 7. With the program on this medium executed by the computer equipped with the media drive means 1, the computer (including the usual peripherals such as mouse, keyboard, and monitor) functions as the image file editing apparatus.

A specific embodiment of the present invention as applied to a digital camera system will now be explained with reference to FIGS. 2 and 3.

Figure 2:
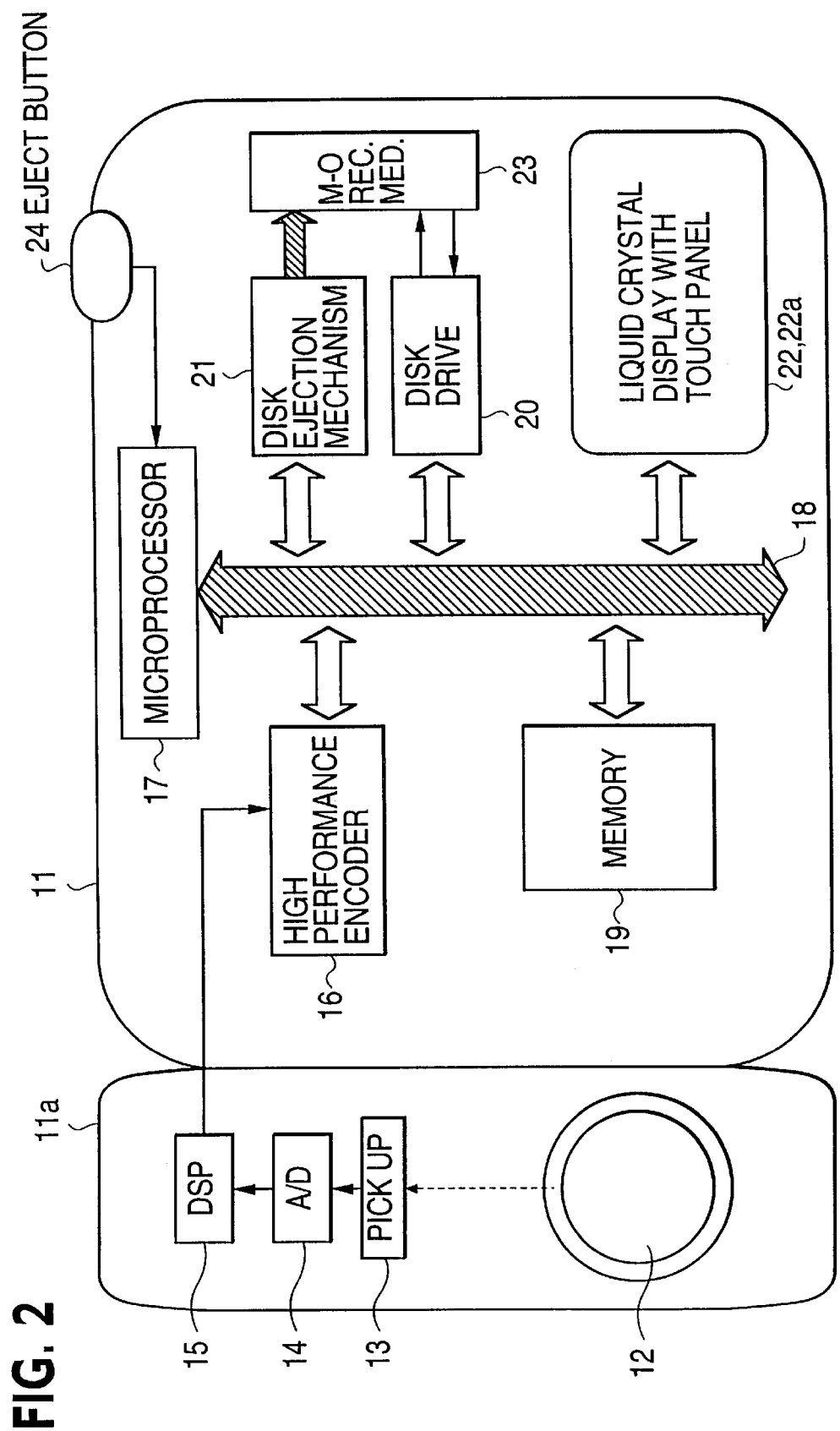
FIG. 2 is a block diagram of a preferred embodiment of the invention as implemented in a digital camera system.
Figure 3:
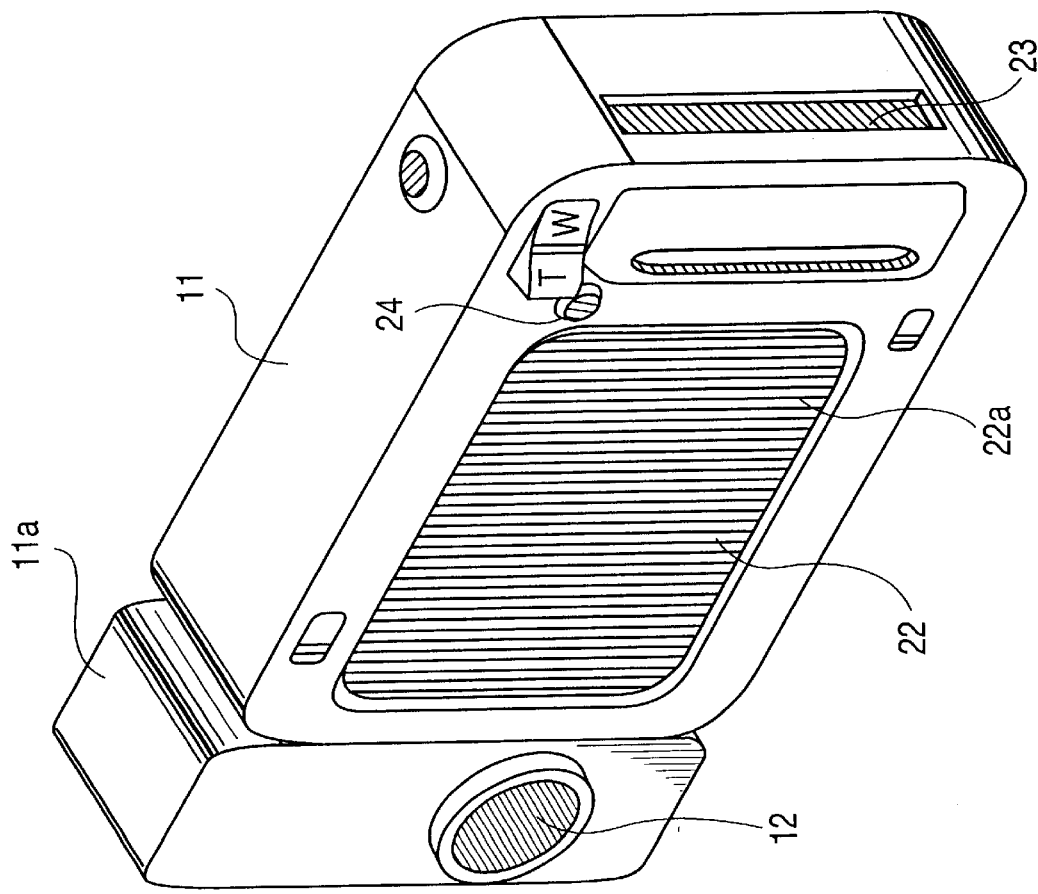
FIG. 3 is a perspective view of the embodiment of FIG. 2.

In FIG. 2 and FIG. 3, a camera 11a as an accessory component is rotatably attached to one side face of a main body 11 of an image file editing apparatus, and a photographing lens or shooting lens 12 for forming an object image is installed in the camera 11a.

The optical axis of the photographing lens 12 is refracted inside the camera 11a, and the light-receiving plane of an image pickup device 13 consisting of a CCD image sensor is placed on the extended optical axis. The photoelectric output of the image pickup device 13 is connected, via an A/D converter 14, to a video signal processor 15 for performing white balance adjustment, gamma correction, and the like. The image information output of the video signal processor 15 is connected to a system bus 18 of a microprocessor 17 via a high-performance encoder 16.

To the system bus 18, there are respectively connected a memory 19, a disk drive 20, a disk ejection mechanism 21, a liquid crystal display 22, and a touch panel 22a, for example. The liquid crystal display 22 is constituted by components (not individually shown) including a video memory that allows rewriting of data transmitted through the system bus 18, a liquid crystal drive circuit for reading out data from the video memory and displaying an image represented by the data, and a liquid crystal screen on which the image is displayed. Touch panel 22a is attached to the display screen of the liquid crystal display 22 and senses the contact position of a finger or pen, for example.

A magneto-optical recording medium 23 is removably installed into the disk drive 20 from outside by the user. A disk ejection mechanism 21 ejects the magneto-optical recording medium 23 in response to a control signal from the microprocessor 17. An eject button 24 for instructing the ejection of the magneto-optical recording medium 23 is provided on the case of the main body 11, and the switching state of the eject button 24 is input to the microprocessor 17.

Figure 4:
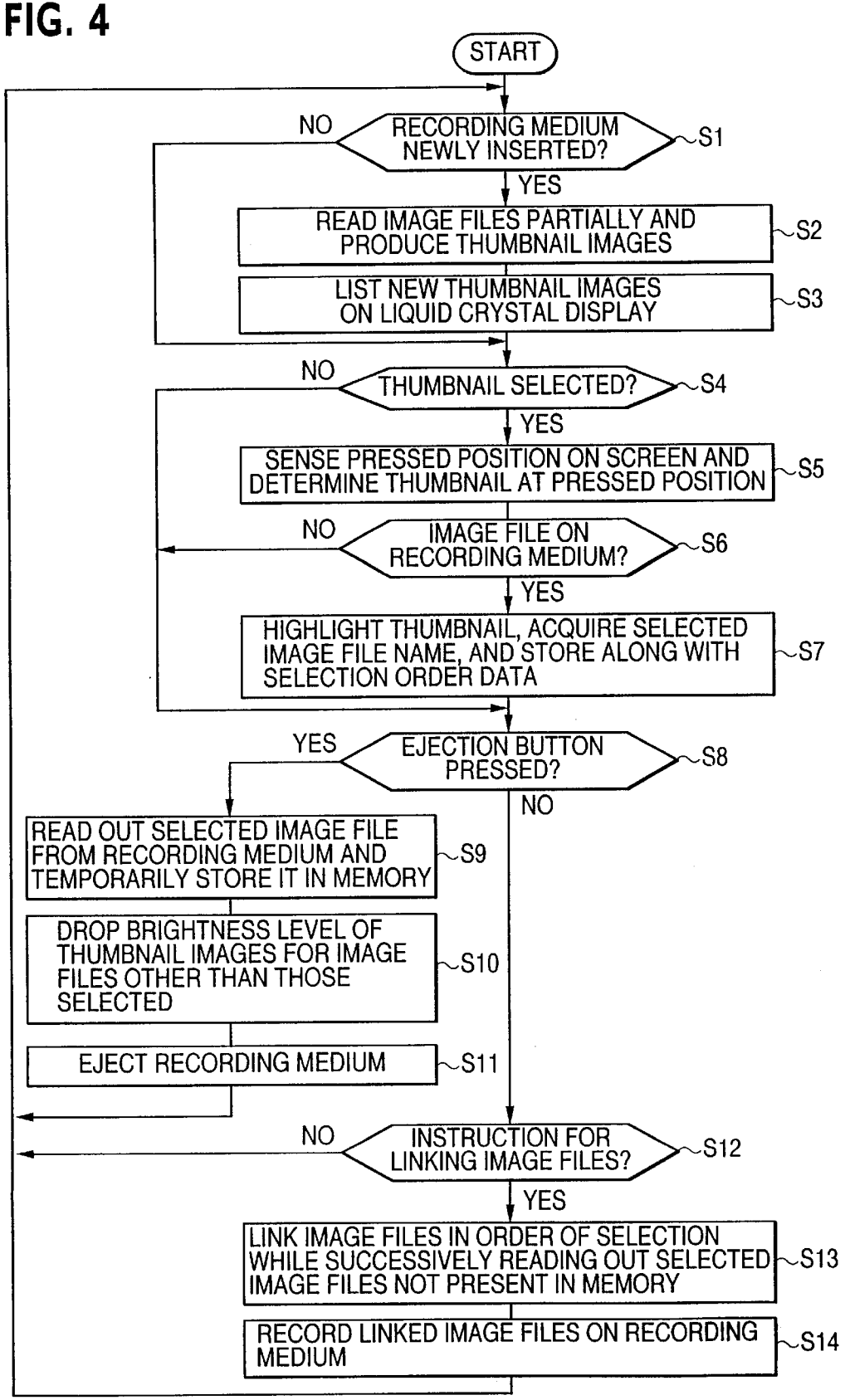
FIG. 4 is a flow chart for explaining the operation of the embodiment of FIGS. 2 and 3.

FIG. 4 is a flow chart for explaining the operation of the present embodiment.

Initially, the microprocessor 17 acquires via the disk drive 20 such information as a FAT (file allocation table) and image file names on the magneto-optical recording medium 23, and determines whether or not this information matches that on the recording medium of the preceding control cycle.

If it is determined that the acquired information does not match that obtained in the preceding cycle, the microprocessor 17 determines that magneto-optical recording medium 23 was newly inserted (step S1).

When the magneto-optical recording medium 23 is determined to have been newly inserted, the microprocessor 17 partially reads out the image files on the magneto-optical recording medium 23 via the disk drive 20. The microprocessor 17 stores in memory 19 the leading images, for example, of the image files, and produces thumbnail images by performing pixel density conversion on these leading images (step S2). The microprocessor 17 displays the thus produced thumbnail images on the liquid crystal display 22 (step S3). These images can be arranged in any suitable manner-for example, in the order of file creation date and time.

Figure 5A:
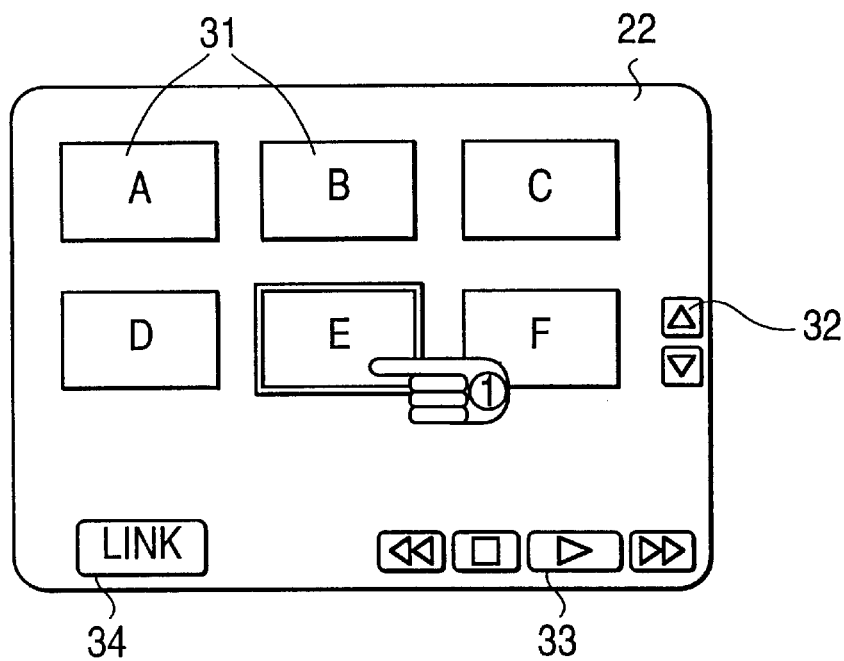
FIGS. 5A and 5B are views showing examples of the display of a liquid crystal display device of the illustrative embodiment.

FIG. 5A is a view showing a display list of thumbnail images as described above. The thumbnail images 31 are displayed sequentially in rows, beginning from the top left corner of the screen of the liquid crystal display 22. Scroll buttons 32 for scrolling the display list of thumbnail images 31 up and down are displayed on the right of the screen of the liquid crystal display 22. A link button 34 for linking already selected image files is displayed at the bottom left portion of the screen, and a playback button 33 for initiating a playback operation is displayed at the bottom right portion of the screen.

Referring again to step S1, when it is determined that the magneto-optical recording medium 23 currently installed is the same as that installed in the preceding cycle, the flow of operation skips to step S4.

Next, the microprocessor 17 senses via the touch panel 22a pressure applied by a finger, pen, or the like, to the display screen. If the display region for thumbnail images 31 is pressed, the microprocessor 17 determines that a thumbnail selection is executed (step S4), and identifies the thumbnail image 31 located in the pressed position (step S5).

If the original image file corresponding to this thumbnail image 31 is an image file recorded on the magneto-optical recording medium 23 currently installed or loaded in the apparatus (step S6), the microprocessor 17 highlights the outline of that thumbnail image 31 on the display 22 (step S7). See, e.g., thumbnail E in FIG. 5A. Also, the microprocessor 17 reads the file name of the selected image file and records it in the memory 19 along with selection order data numerically indicating the position (first, second, etc.) of that image file in the order of selected image files.

Referring again to step S4, when it is determined that no thumbnail selection occurred, the flow skips to step S8. The flow also skips to step S8 when it is determined in step S6 that an image file that does not exist on the currently installed magneto-optical recording medium 23 was selected.

In step S8, the microprocessor checks whether the eject button 24 was pressed.

If the eject button was pressed, the microprocessor 17 sequentially reads out, via the disk drive 20, the image files which are recorded on the current magneto-optical recording medium 23 and whose thumbnail images have been selected. The microprocessor 17 temporarily stores in the memory 19 the image files thus read out, along with such information as their file names or the like (step S9).

Figure 5B:
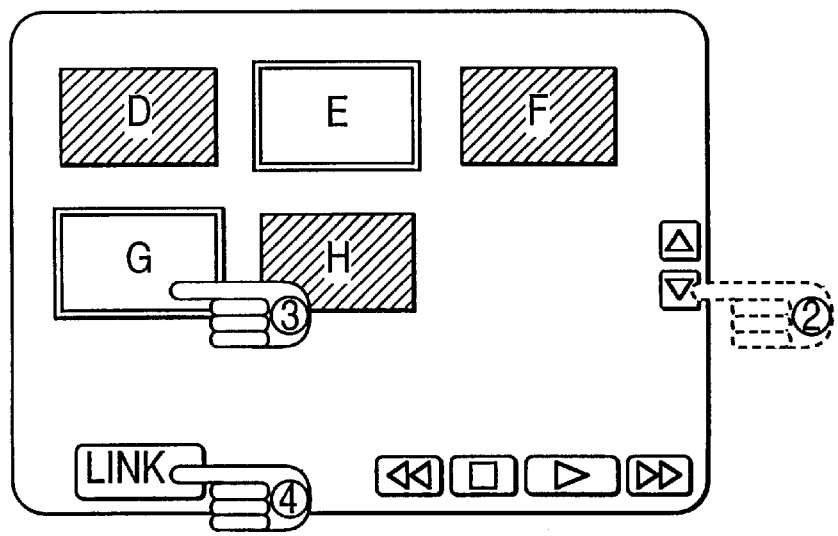
Figure 6:
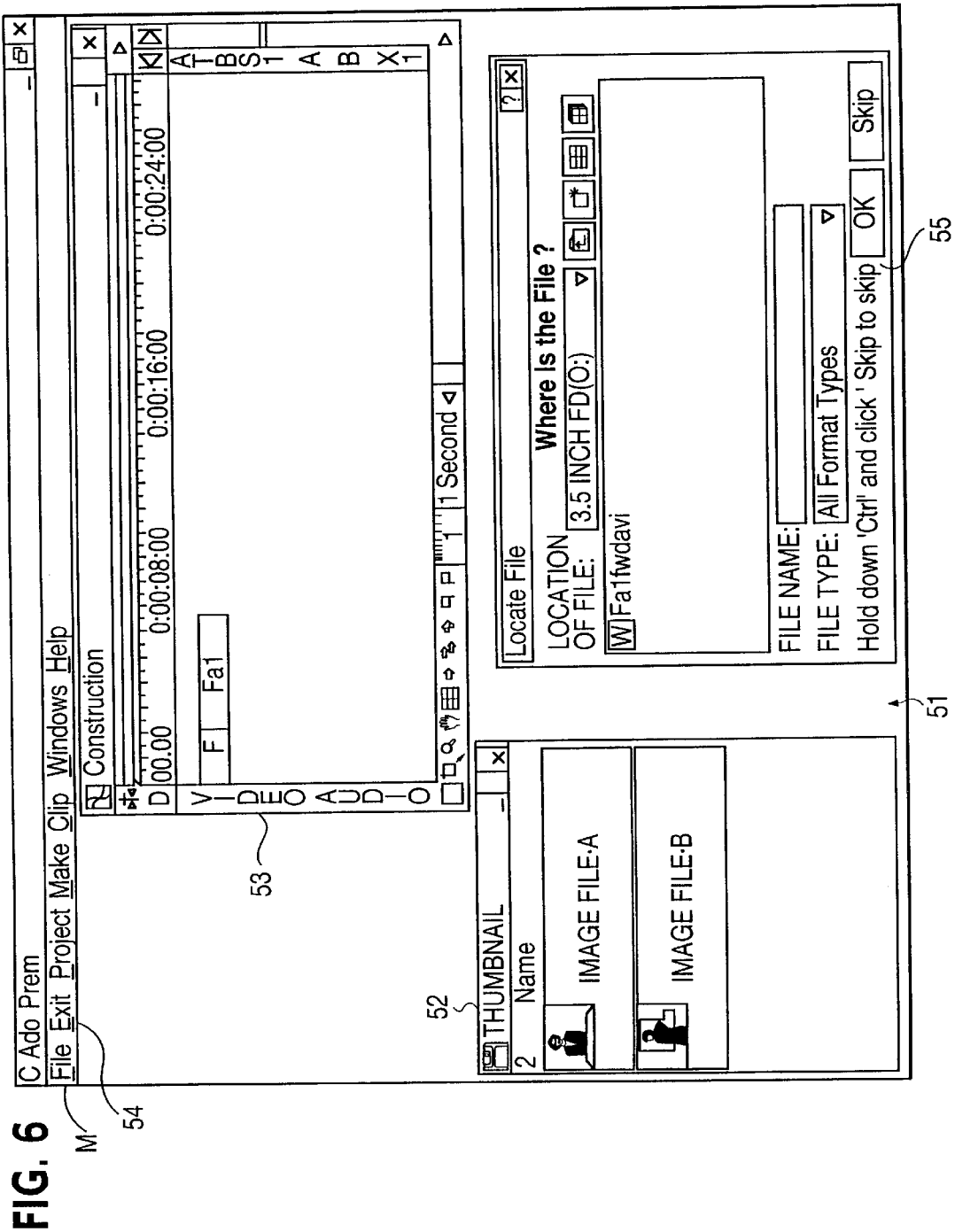
FIG. 6 is a view showing a display screen of a computer utilizing a conventional image editing program.

The microprocessor 17 also rewrites the video memory of the liquid crystal display 22 via the system bus 18 and drops, by about half, the brightness level of the thumbnail images 31 that were not selected (step S10). This is indicated by hatching in FIG. 5B. The operator is thus informed, by the reduced brightness level, of those image files that will be unavailable for editing.

Upon completion of reading-out of the image files, the microprocessor 17 drives the disk ejection mechanism 21 to eject the magneto-optical recording medium 23 (step S11). After ejection of the magneto-optical recording medium 23, the microprocessor 17 returns to step S1 and repeats the above-described operation.

Referring again to step S8, if it is determined that the eject button 24 was not pressed, the microprocessor 17 determines whether or not the link button 34 was pressed (step S12). If the link button 34 was not pressed, the microprocessor 17 returns to step S1 and repeats the above ,operation.

If the link button 34 was pressed, the microprocessor 17 initially links the image files in the memory 19 according to the selection order data. When the linking of the image files in the memory 19 is completed, the microprocessor 17 reads out the image files selected from the currently installed magneto-optical recording medium 23. The microprocessor 17 further links the image files read out from the currently installed medium according to the selection order data, and also links the last-selected image file in memory 19 to the first image file selected from the currently installed medium (step S13).

When the above editing operations are completed, the microprocessor 17 operates the disk drive 20 to record the image files that have been linked onto the magneto-optical recording medium 23 (step S14). Then, the microprocessor 17 returns to step S1 and repeats the above-described operation.

With the operation as explained above performed in the present embodiment, the selected image files are automatically recorded in the memory 19 when the magneto-optical recording medium 23 is to be ejected. Accordingly, the operator can be spared the cumbersome procedure of consciously transferring image files to a hard disk drive, for example.

Since the selected image files are stored in the memory 19 even after ejection of the magneto-optical recording medium 23, image editing can be performed continuously without any problem.

Furthermore, only the image files determined to be necessary to the editing operation—that is, the selected image files—are transferred to and stored in the memory 19. Accordingly, there is no recording of unnecessary image files in the memory 19, and the storage capacity of the memory 19 is used without waste.

Also, since the list of the image files on the magneto-optical recording medium 23 continues to be displayed even after the ejection of the recording medium, the operator can continue image editing for the selected image files without being particularly concerned about the ejection of the magneto-optical recording medium 23.

Further still, those image files that do not exist on the currently installed magneto-optical recording medium 23 or in the memory 19 are clearly indicated as not being available for editing, by dropping the brightness level of the thumbnail images 31 of those image files. Accordingly, there is no risk of the operator misunderstanding which image files are available for editing.

With regard to the corresponding relationships between the invention as shown in FIG. 1 and the present embodiment, the media drive means 1 of FIG. 1 corresponds to the disk drive 20, the list display means 2 corresponds to the liquid crystal display 22 and the microprocessor 17 as including the function of listing image files in the format of thumbnail images. The file selecting means 3 corresponds to the touch panel 22a and the microprocessor 17 as including the function of selecting listed image files according to the contacted positions on the screen. The editing means 4 corresponds to the microprocessor 17 as including the information processing function for linking image files. The instruction input means 5 corresponds to the eject button 24. The temporary storage means 6 corresponds to the memory 19 and the microprocessor 17 as including the function of reading out image files and temporarily recording them in the memory 19. The media ejecting means 7 corresponds to the disk ejection mechanism 21, and the identifying information corresponds to the thumbnail images 31.

Although an example of a dedicated image file editing apparatus has been described in relation to the illustrative embodiment, the image file editing apparatus may be realized in the form of a general purpose programmable computer, such as a personal computer or the like. In such case, the operations of the touch panel 22a are performed with a mouse, keyboard, or other input device, and the operations of microprocessor 17 are performed by the CPU of the computer using a program executing the flow chart shown in FIG. 4 recorded on a medium that is read by the computer. Also, in regard to the functions in the flow chart of FIG. 4 that can be realized by the operating system of the computer, it is sufficient that the above-mentioned program invoke the corresponding functions of the operating system.

While the magneto-optical recording medium 23 is employed as a recording medium in the illustrative embodiment, the present invention is not limited as to the material or form of the recording medium. Any recording medium may be used provided it is capable of recording image files. For example, the recording medium may be an optical recording medium, a magnetic recording medium, or a memory card.

Furthermore, while the image files are temporarily stored in the memory 19 in the illustrative embodiment, the present invention is not limited to the use of a particular form of storage device for the temporary storage means. Any temporary storage means capable of recording image files may be employed. For example, a hard disk device or the like may be used.

Although linking of image files is explained as an editing operation in relation to the illustrative embodiment, the present invention is not limited to this editing operation, and any type of editing operation may be performed on image files. For example, copying, moving, image composition, or the like, of image files across a plurality of recording media may be implemented. The linkage processing of image files may include overlapping, fade-in, fade-out, wipe-in, wipe-out, and other special linkage processing.

As explained above, in the image file editing apparatus of the invention, selected image files are automatically recorded when the recording medium is to be ejected. Accordingly, the operator can be spared the inconvenience of consciously transferring image files to a hard disk drive or the like. Further, even if the operator mistakenly ejected the recording medium, image editing can be continued without any problem.

The image file editing apparatus of the present invention also utilizes the temporary memory with high efficiency, because only the image files selected in the process of the image editing operation are automatically recorded to the temporary memory. Accordingly, the storage capacity of the temporary memory is not wasted. By contrast, the conventional example in which all image files are copied from the recording media to a hard disk device in preparation for the editing process uses storage capacity inefficiently. As a result the conventional apparatus disadvantageously requires a high capacity hard disk device.

It is to be understood, of course, that the present invention is not limited to the particular forms described herein and that numerous variations are possible in keeping with the scope of the invention as defined in the appended claims.

The invention claimed is:

1. An image file editing apparatus, comprising:

media drive means for performing writing and reading of image files on a recording medium that is removably installed from outside;

list display means for causing said media drive means to acquire and produce identifying information about image files on said recording medium, said list display means displaying a list of image files in a format of said identifying information;

file selecting means for selecting, in accordance with an external selecting operation, among the listed image files displayed by said list display means;

instruction input means for receiving, from outside, an instruction for ejection of said recording medium;

temporary storage means for causing said media drive means to read at least one image file selected by said file selecting means from said recording medium when said instruction input means receives said instruction for ejection, and for temporarily storing said at least one image file from said recording medium;

media ejecting means for ejecting said recording medium from said media drive means, or placing said recording medium in an ejection-standby state, after completion of storing to said temporary storage means; and editing means for performing an editing operation on an image file stored by said temporary storage means from the ejected recording medium and an image file selected by said file selecting means from a subsequently installed recording medium.

2. The image file editing apparatus as defined in claim 1, wherein:

said editing operation comprises at least one of copying, moving, linking, and image composition.

3. The image file editing apparatus as defined in claim 1, wherein:

said list display means continues display of the list of image files on a recording medium after ejection of that recording medium, and changes a display mode of non-selected image files on that recording medium into a predetermined display mode for indicating unavailability of the non-selected image files for editing.

4. The image file editing apparatus as defined in claim 1, wherein:

said editing means is constructed to perform said editing operation after storage of the selected image file from said subsequently installed recording medium by said temporary storage means and ejection of said subsequently installed recording medium.

5. A medium in which is recorded a program for realizing the image file editing apparatus as defined in any one of claim 1 through claim 4, using a computer equipped with said media drive means, wherein said program causes said computer to function as said list display means, said file selecting means, said instruction input means, said temporary storage means, said media ejecting means, and said editing means.

6. An image file editing apparatus comprising:

a read device that can be loaded with a removable recording medium and that reads image files on the loaded recording medium;

a file selection device to select among image files on the loaded recording medium;

a storage device that operates automatically, in response to an input command for removing the recording medium, to store one or more selected image files from the loaded recording medium; and an editing device to perform an editing operation on at least one selected image file stored in said storage device from said recording medium and at least one selected image file from a recording medium loaded in said read device after removal of the first-mentioned recording medium.

7. The image file editing apparatus as defined in claim 6, further comprising:

a list display device which causes said read device to acquire and produce identifying information about image files on a loaded recording medium, said list display device displaying a list of image files in the format of said identifying information; and wherein said file selection device selects among image files using said list.

8. The image file editing apparatus as defined in claim 6, wherein:

said editing operation comprises at least one of copying, moving, linking, and image composition.

9. The image file editing apparatus as defined in claim 7, wherein:

said list display device continues display of the list of image files on a recording medium after ejection of that recording medium, and changes a display mode of non-selected image files on that recording medium into a predetermined display mode for indicating unavailability of the non-selected image files for editing.

10. A medium in which is recorded a program for realizing the image file editing apparatus as defined in any one of claim 6 through claim 9, using a computer equipped with said read device, wherein:

said program causes said computer to function as each named device.

11. An image file editing method comprising:

loading a removable first image file recording medium in a read device that reads image files on the loaded recording medium;

operating said read device to identify image files on said first recording medium;

selecting among the image files on said first recording medium;

in response to a command for removing said first recording medium, automatically storing one or more selected image files from said first recording medium in a storage device;

removing said first recording medium and loading a removable second image file recording medium in said read device;

operating said read device to identify image files on said second recording medium;

selecting among image files on said second recording medium; and performing an editing operation on at least one selected image file stored in said storage device from said first recording medium and at least one selected image file from said second recording medium.

12. The image file editing method as defined in claim 11, further comprising:

automatically storing said at least one selected image file from said second recording medium in said storage device in response to a command for removing that recording medium; and wherein said editing operation is performed after removal of said second recording medium from said read device.

13. The image file editing method as defined in claim 11, and which is performed using a general purpose programmable computer.

* * * * *